(12) United States Patent
Kim

(10) Patent No.: US 8,653,767 B2
(45) Date of Patent: Feb. 18, 2014

(54) METHOD FOR CONTROLLING REFRIGERATOR

(75) Inventor: Myung Hwan Kim, Gyeongsangnam-do (KR)

(73) Assignee: LG Electronics Inc., Seoul (KR)

(*) Notice: Subject to any disclaimer, the term of this patent is extended or adjusted under 35 U.S.C. 154(b) by 986 days.

(21) Appl. No.: 12/756,216

(22) Filed: Apr. 8, 2010

(65) Prior Publication Data

US 2011/0087376 A1    Apr. 14, 2011

(30) Foreign Application Priority Data

Oct. 13, 2009   (KR) ................. 10-2009-0097153

(51) Int. Cl.
*H02P 7/00*     (2006.01)
*A47B 95/02*    (2006.01)
*A47B 96/04*    (2006.01)
*F25B 41/00*    (2006.01)
*F25D 19/00*    (2006.01)
*G05D 15/00*    (2006.01)

(52) U.S. Cl.
USPC .......... 318/282; 312/319.7; 312/405; 62/127; 62/449; 700/275

(58) Field of Classification Search
USPC .......... 318/282; 312/319.7, 405; 62/127, 449; 700/275
See application file for complete search history.

(56) References Cited

U.S. PATENT DOCUMENTS

| 2008/0134698 A1* | 6/2008 | Cho et al. ............... 62/127 |
| 2009/0033189 A1* | 2/2009 | Glanz et al. ............. 312/405 |
| 2009/0160297 A1* | 6/2009 | Anikhindi et al. ......... 312/319.7 |
| 2010/0058792 A1* | 3/2010 | Seo et al. ................ 62/264 |

* cited by examiner

*Primary Examiner* — Eduardo Colon Santana
*Assistant Examiner* — Gabriel Agared
(74) *Attorney, Agent, or Firm* — Fish & Richardson P.C.

(57) ABSTRACT

The embodiment relates to a method for controlling a refrigerator. The method for controlling a refrigerator including: inputting an opening signal to open a selected door of a plurality of doors; rotating a driving motor to open a selected door; and opening the selected door by pushing the selected door of the plurality of doors by one of a plurality of push members by the rotation of the driving motor.

5 Claims, 12 Drawing Sheets

Fig.9

| POSITION OF PUSH MEMBER | FIRST SENSING UNIT | SECOND SENSING UNIT |
|---|---|---|
| NEUTRAL | On | On |
| NEUTRAL → MAXIMUM ADVANCING | Off | Off |
| MAXIMUM ADVANCING | On | Off |
| MAXIMUM ADVANCING → NEUTRAL | Off | Off |
| NEUTRAL → MAXIMUM BACKWARD | Off | Off |
| MAXIMUM BACKWARD | Off | On |

METHOD FOR CONTROLLING REFRIGERATOR

CROSS-REFERENCE TO RELATED APPLICATIONS

The present application claims priority under 35 U.S.C. 119 and 35 U.S.C. 365 to Korean Patent Application No. 10-2009-0097153 (filed on 13 Oct. 2009), which is hereby incorporated by reference in its entirety.

BACKGROUND

The embodiment relates to a method for controlling a refrigerator.

Generally, a refrigerator is a device that stores foods in a low temperature state.

The refrigerator includes a cabinet in which a storage compartment is formed and a door that opens and closes the storage compartment. The storage compartment may include a freezing compartment and a refrigerating compartment and the door may include a freezing compartment door and a refrigerating compartment door.

In order to shield the storage compartment, a gasket is provided at a rear surface of the door. When the door closes the storage compartment, the gasket is closely attached to the cabinet to prevent cold air inside the storage compartment from being leaked to the outside.

The cabinet is made of a metal material and an inner side of the gasket is provided with a magnet, such that the gasket may be closely attached to the cabinet. In order to open and close the storage compartment, a user pulls the door with a force larger than the attractive force of the magnet and the cabinet.

SUMMARY

Embodiments provide a method for controlling a refrigerator.

In one embodiment, a method for controlling a refrigerator including: inputting an opening signal to open a selected door of a plurality of doors; rotating a driving motor to open a selected door; and opening the selected door by pushing the selected door of the plurality of doors by one of a plurality of push members by the rotation of the driving motor.

The details of one or more embodiments are set forth in the accompanying drawings and the description below. Other features will be apparent from the description and drawings, and from the claims.

BRIEF DESCRIPTION OF THE DRAWINGS

FIG. 9 is a table showing a state of a sensing unit according to the position of the push member;

DETAILED DESCRIPTION OF THE EMBODIMENTS

Figure 1:
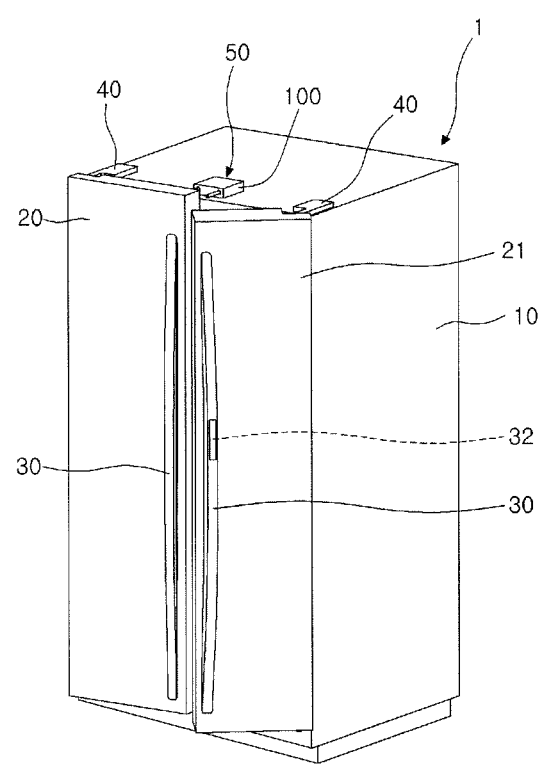
FIG. 1 is a perspective view of a refrigerator according to a first embodiment.

Reference will now be made in detail to the embodiments of the present disclosure, examples of which are illustrated in the accompanying drawings.

It is to be noted that in giving reference numerals to elements of each drawing, like reference numerals refer to like elements even though like elements are shown in different drawings. Further, in describing exemplary embodiments of the present invention, well-known functions or components will not be described in detail since they may unnecessarily obscure the understanding of the present invention.

In addition, in describing components of exemplary components of the present invention, terms such as first, second, A, B, (a), (b), etc. can be used. These terms are used only to differentiate the components from other components. Therefore, the nature, times, sequence, etc. of the corresponding components are not limited by these terms. In the case that any components are "connected', "coupled", or "joined" to other components, it is to be understood that the components may be directly or joined to other components but be "connected", "coupled", or "joined" to other components via another component.

FIG. 1 is a perspective view of a refrigerator according to a first embodiment.

Referring to FIG. 1, a refrigerator 1 according to the first embodiment includes a cabinet 10 that has one or more storage compartment formed therein and a plurality of doors 20 and 21 that opens and closes the storage compartment. The one or more storage compartment may include a freezing compartment and a refrigerating compartment. The freezing compartment and the refrigerating may be disposed in a left and right direction.

The plurality of doors 20 include the freezing compartment door 20 that opens and closes the freezing compartment and the refrigerating compartment door 21 that opens and closes the refrigerating compartment. Each of the doors 20 is provided with a door handle 30.

It is to be noted that the first embodiment describes a side by side type refrigerator by way of example and the idea of the first embodiment can be applied to all types of refrigerators that may include a plurality of doors.

Meanwhile, each door 20 and 21 or each door handle 30 may be provided with an operating unit 32 to which door opening signals are input. The operating unit 32 is operated by an operation of a user and a door opening apparatus 50 to be described later is operated by the operating unit 32. FIG. 1 shows a case where the operating unit 32 is provided at the door handle 30 by way of example. The operating unit 32 may include a sensing unit, a switch, etc.

Meanwhile, the door opening apparatus 50 is provided on an outer upper surface of the cabinet 10. The door opening apparatus 50 pushes the door 20 at the time of operating the operating unit 32, such that the doors 20 and 21 can open the storage compartment.

The door opening apparatus 50 may be disposed at a portion where a pair of doors 20 and 21 is adjacent to each other.

Figure 2:
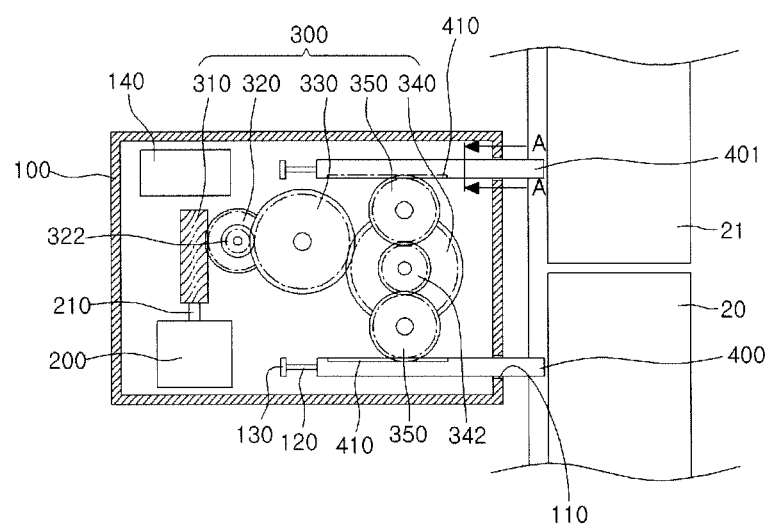
FIG. 2 is a diagram showing an inner structure of a door opening apparatus according to the first embodiment.

FIG. 2 is a diagram showing an inner structure of the door opening apparatus according to the first embodiment.

Referring to FIG. 2, the door opening apparatus 50 includes a case 100 that forms an outer appearance, a driving motor 200 that generates a driving force, a plurality of push members 400 and 401 that generates the driving force, and a power transfer unit 300 that transfers the rotating force of the driving motor 200 to the plurality of push members 400 and 401.

In detail, the case 100 is mounted on the upper surface of the cabinet 10 and the front surface of the case 100 may be formed with a plurality of holes 100 through which each push member 400 and 401 can penetrate.

The driving motor 200 is a motor that can be rotated in a forward and reverse direction. A rotating shaft 210 of the driving motor 200 extends in a direction intersecting with each push member 400. The operation transfer unit 300 is connected to the rotating shaft 210 of the driving motor 200.

The plurality of push members 400 and 401 includes a first push member 400 that pushes the refrigerating compartment door 20 and a second push member 401 that pushes the refrigerating compartment door 21. Each push member 400 and 401 is connected to the power transfer unit 300 at a position spaced from each other. The plurality of push members 400 and 401 are disposed in parallel.

In detail, the plurality of push members 400 and 401 extend in a forward and backward direction of the refrigerator 1. The plurality of push members 400 and 401 contacts or is spaced to and from the rear surface of each door 20 in a neutral state and when the operating unit 32 is operated, at least one push member 400 and 401 moves to at least one door 20 and 21 to push the doors 20 and 21.

A portion of each push member 400 and 401 is protruded to an outer side of the case 110 through each hole 110 of the case 100. Each push member 400 is formed with a rack gear 410. The rack gear 410 is connected to the power transfer unit 300. Therefore, the rack gear 410 may be referred to a connection unit.

Meanwhile, the power transfer unit 300 is provided inside the case 100. The power transfer unit 300 includes a plurality of gears. The plurality of gears includes a worm gear 310 that is connected to the rotating shaft 310 of the driving motor 200 and a first gear 320 to a fourth gear 350.

In detail, the first gear 320 is engaged with the worm gear 310. The rotating shaft of the first gear 320 intersects with the plurality of push members 400 and 401 and the rotating shaft 210 of the driving motor 200. The first gear 320 includes an upper gear 322 that is engaged with the second gear 330. A diameter of the upper gear 322 is smaller than that of the second gear 330. The second gear 330 is engaged with a third gear 340. The third gear 340 includes the upper gear 342 that is engaged with a plurality of fourth gears 350.

The plurality of fourth gears 350 are engaged with the upper gear 342 at a position spaced from each other. The plurality of fourth gears 350 are disposed at an opposite side based on the upper gear 342.

Any one of the plurality of fourth gears 350 is connected to the rack gear of the first push member 400 and the other one of the plurality of fourth gears 350 is connected to the rack gear of the second push member 401.

As described above, the plurality of gears other than the worm gear 310 has a spur gear form and the rotating force of the driving motor 200 is transferred to the push members 400 and 401 by a combination of gears having different gear ratios.

At this time, the plurality of push members is selectively advanced and reversed according to the forward and reverse rotation of the driving motor 200 and when any one push member moves in one direction, the other push member moves in an opposite direction.

Meanwhile, the case 100 is formed with a plurality of moving guides 120 that guide a front and rear direction movement of each push member 400 and 401. The rear end of each moving guide 120 may be formed with a stopper 130 that limits the backward movement of each push member 400.

Figure 3:
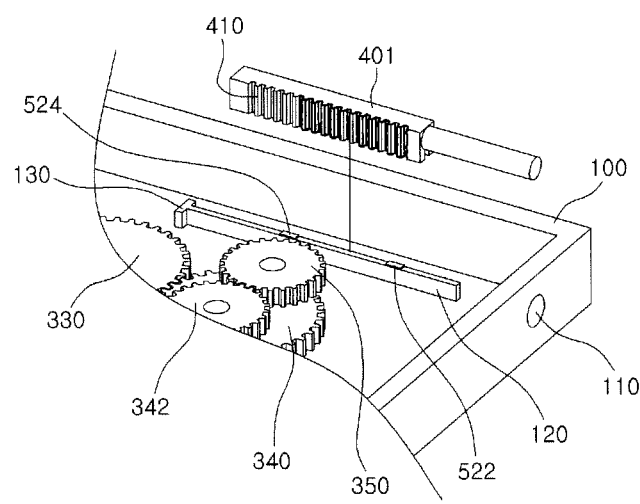
FIG. 3 is a partially exploded perspective view showing a configuration of the door opening apparatus according to the first embodiment.
Figure 4:
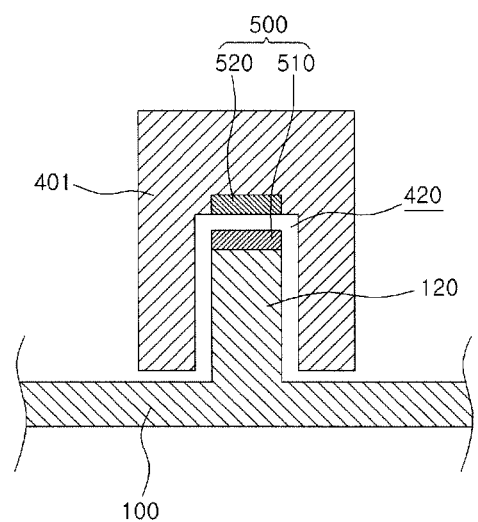
FIG. 4 is a cross-sectional view taken along line A-A of FIG. 1.

FIG. 3 is a partial perspective view of a configuration of the door opening apparatus according to the first embodiment and FIG. 4 is a cross-sectional view taken along line A-A' of FIG. 1.

Referring to FIGS. 2 to 4, each moving guide 120 extends in parallel with the moving direction of each push member 400.

Each moving guide 120 may be integrally formed with the case 100 and may be protruded upward from the case 100. Unlike this, the moving guide 120 may be coupled to the case 100 by a screw, a hook, etc.

The moving guide 120 is received in a receiving part 420 that is depressedly formed in the push members 400 and 401. The stopper 130 extends in a direction intersecting with an extending direction of the moving guide 120 from the end of the moving guide 120.

Meanwhile, the position change due to the movement of the push members 400 and 401 can be sensed by a position sensing mechanism 500. The rotating direction of the driving motor 200 is determined according to the position of the push members 400 and 401 sensed by the position sensing mechanism 500. In other words, the rotating direction of the driving motor 200 is determined according to the moving distance of the push members 400 and 401.

The position sensing mechanism 500 includes one or more position confirming unit 510 that is provided at any one of the plurality of push members 400 and 401 and one or more sensing unit 520 that is provided at the case 100 or the moving guide 120. For example, the position confirming unit 510 may be positioned in the receiving part and the sensing unit 520 may be positioned at the moving guide 120.

The first embodiment will describe a case where the position confirming unit 510 is provided at the second push member 401. Of course, the position confirming unit 510 is provided at the first push member 400 and the sensing unit 520 may be provided at the moving guide or the case corresponding to the first push member 400. In addition, the position confirming unit 510 may be provided at each push member 400 and 401 and the sensing unit 520 may be provided at the moving guide 120 or the case, respectively.

The sensing unit 520 may be any one of a switch, a hole sensing unit, a photo sensing unit, etc. The position confirming unit 510 may have any configuration such as a protruding part, a magnet, a groove, etc. that can be recognized by the sensing unit 520.

Figure 5:
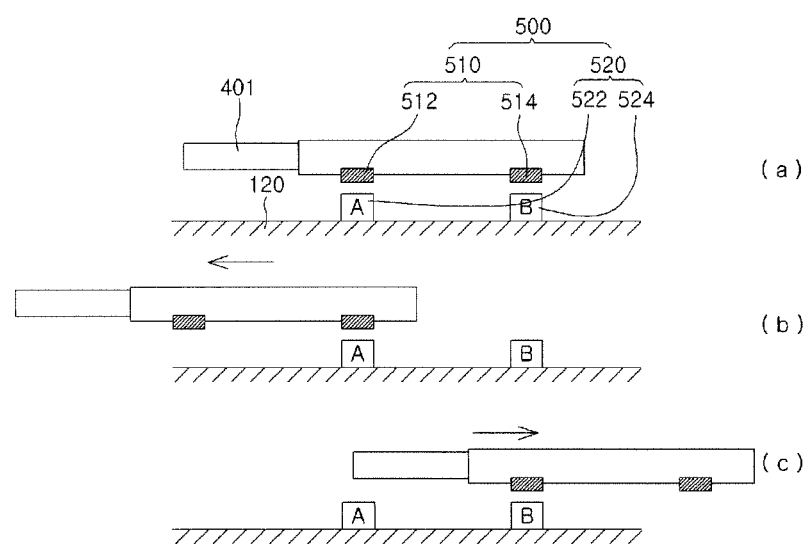
FIG. 5 is a diagram showing a shape where a position of the push member according to the first embodiment is changed.
Figure 6:
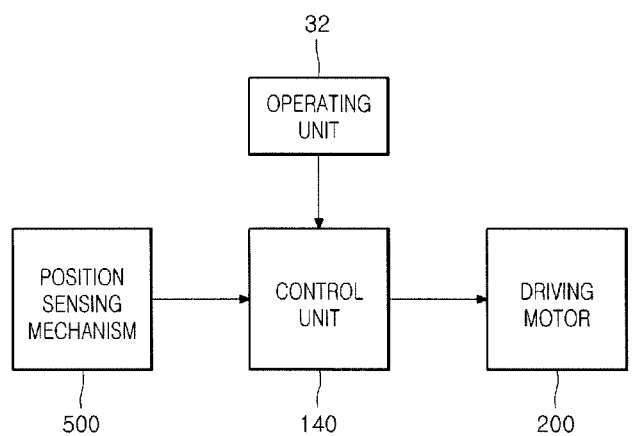
FIG. 6 is a block diagram showing a structure of controlling a refrigerator according to the first embodiment.

FIG. 5 is a diagram showing a shape where the position of the push member according to the first embodiment is changed and FIG. 6 is a block diagram showing a control structure of the refrigerator according to the first embodiment.

Referring to FIGS. 3 to 6, the second push member 401 may be provided with the plurality of position confirming units 510 by way of example. The plurality of position confirming units 510 includes a first position confirming unit 512 and a second position confirming unit 514. The plurality of position confirming units 510 are disposed to be spaced in a parallel direction with the extending direction of the second push member 401.

In addition, the moving guide 120 corresponding to the second push member may include the plurality of sensing units 520 by way of example. The plurality of sensing units 520 includes a first sensing unit 522 and a second sensing unit 524. The plurality of sensing units 520 is disposed to be spaced in a parallel direction with the extending direction of the moving guide 120. A spaced distance between the plurality of position confirming units 510 is the same as a spaced distance between the plurality of sensing units 520.

Meanwhile, when the operating unit is operated, signals from the operating unit 32 are transferred to the control unit 140. Then, the control unit 140 drives the driving motor 200. The signals sensed in the position sensing mechanism 500 are transferred to the control unit 140 and the control unit controls the driving motor 200 according to the signals of the position sensing mechanism 500.

In the first embodiment, as shown in FIG. 5A, when the first and second position confirming units 512 and 514 are sensed by the first and second sensing units 522 and 524, respectively, the control unit 140 is determined that the second push member 401 is positioned at an initial position, that is, a neutral position. When any one of the push members 400 and 401 is positioned at the neutral position, the other one of push members 400 and 401 is positioned at the neutral position.

As shown in FIG. 5B, when the second position confirming unit 514 is sensed in the first sensing unit 522, the control unit 140 is determined that the second push member 401 maximally moves forward. When any one of the push members 400 and 401 maximally moves forward, the other one of the push members 400 and 401 maximally moves backward.

On the other hand, as shown in FIG. 5C, when the first position confirming unit 512 is sensed in the second sensing unit 524, the control unit 140 is determined that the second push member 401 maximally moves backward.

In the first embodiment, moving the push members 400 and 401 forward means a direction where the push members 400 and 401 approaches to the door or a direction which pushes the door and moving the push members 400 and 401 backward means a direction where the push member is away from the door.

Figure 7:
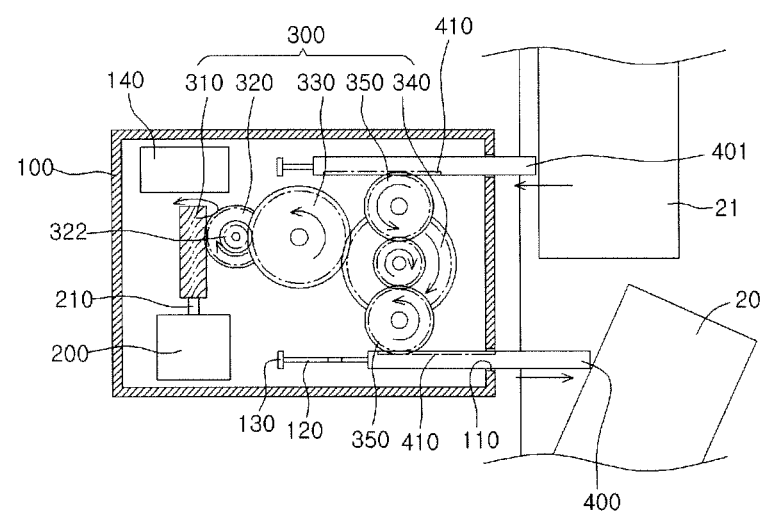
FIG. 7 is a diagram showing a state where a freezing compartment door according to the first embodiment is opened.
Figure 8:
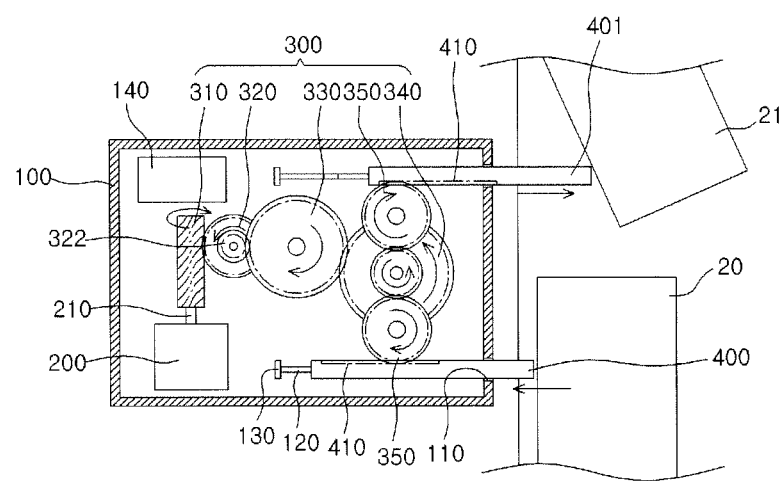
FIG. 8 is a diagram showing a state where a refrigerating compartment door according to the first embodiment is opened.
Figure 10:
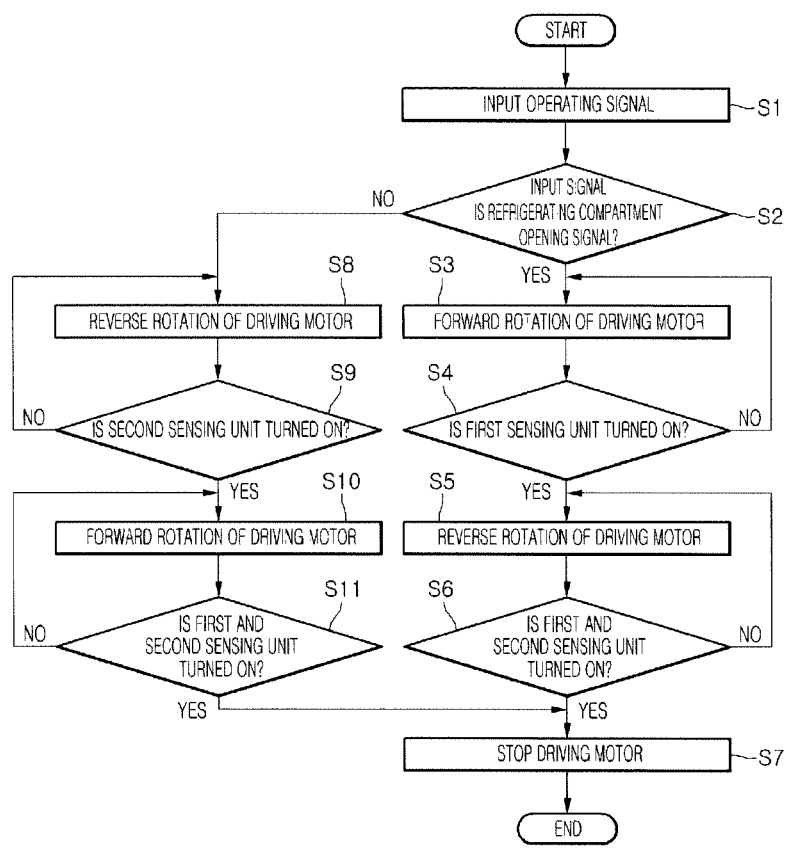
FIG. 10 is a flow chart showing in detail an opening process of the door according to the first embodiment.

FIG. 7 is a diagram showing a state where the freezing compartment door according to the first embodiment is opened and FIG. 8 is a diagram a state where the refrigerating compartment door according to the first embodiment is opened. In addition, FIG. 9 shows Table showing a state of the sensing unit according to the position of the push member and FIG. 10 is a flow chart showing in detail an opening process of the door according to the first embodiment.

FIGS. 5 to 10, in the state where the freezing compartment and the freezing compartment are opened, each push member 400 and 401 contacts or is spaced to and from each door 20 and 21.

In this state, as shown in FIG. 5A, each position confirming unit 512 and 514 is sensed in each sensing unit 522 and 524. In other words, each sensing unit 522 and 524 is turned on. While the second push member 401 moves forward, each position confirming unit 512 and 514 is not sensed in the first sensing unit 522 and the second sensing unit 524. In other words, each sensing unit 522 and 524 is turned off. When the second push member 401 maximally moves forward, the first sensing unit 522 is turned on and the second sensing unit 524 is turned off.

On the other hand, while the second push member moves backward from the neutral position, each position confirming unit 512 and 514 is not sensed in the first sensing unit 522 and the second sensing unit 524. In other words, each sensing unit 522 and 524 is turned off. When the second push member 401 maximally moves backward, the second sensing unit 524 is turned on and the first sensing unit 524 is turned off.

In order to open the specific door, operating signals are input through the operating unit 32 (S1). Then, the control unit 140 determines whether the input signal is a signal for opening the refrigerating compartment door (S2).

If it is determined that the input signal is a signal for opening the refrigerating compartment door, the control unit is controlled so that the rotating shaft 210 of the driving motor 200 is rotated in a forward direction (S3). When the rotating shaft of the driving motor 200 is rotated forward, the worm gear 310 is rotated in a forward direction.

When the worm gear 310 is rotated in a forward direction, the first gear 320 is rotated counterclockwise by way of example. The second gear 330 is rotated clockwise, the third gear 340 is rotated counterclockwise, and the plurality of fourth gears 350 are rotated clockwise.

At this time, since the first gear 320 to the fourth gear 350 has different gear ratios, they can be rotated at a relatively low speed even though the driving motor 200 is rotated at a high speed, thereby making it possible to make a force, which is transferred to each push member 400 and 401, large.

When the plurality of fourth gears 350 are rotated clockwise, the second push member 401 moves forward to push the refrigerating compartment door 21. At this time, the first push member 400 moves backward.

While the second push member 401 moves forward, it is determined that the first sensing unit 522 is turned on (S4). When the first sensing unit 522 is turned on, the control unit is controlled so that the rotating shaft of the driving motor is rotated in a reverse direction (S5). Then, the second push member 401 moves backward. While the second push member 401 moves backward, it is determined that the first and second sensing units 522 and 524 are turned on (S6). If the first and second sensing units 522 and 524 are turned on, the control unit 140 stops the driving motor (S7). Each push member 400 and 401 is positioned at the neutral position.

On the other hand, as the determining result at step S2, if it is determined that the input signal is not a signal for opening the refrigerating compartment door, the control unit 140 is determined that the input signal is a signal for opening the freezing compartment door. The control unit 140 is controlled so that the rotating shaft 210 of the driving motor 200 is rotated in a reverse direction (S8). The second push member 401 moves backward and the first push member 400 moves forward to push the freezing compartment door 20.

While the second push member 401 moves backward, it is determined that the second sensing unit 524 is turned on (S9). When the second sensing unit 524 is turned on, the control unit is controlled so that the rotating shaft of the driving motor 200 is rotated in a forward direction (S10). Then, the second push member 401 moves backward. While the second push member 401 moves forward, it is determined that the first and second sensing units 522 and 524 are turned on (S11). If the first and second sensing units 522 and 524 are turned on, the control unit 140 stops the driving motor (S7). Each push member 400 and 401 is positioned at the neutral position.

According to the first embodiment, the push member pushes the door which should be opened, thereby making it possible to reduce force applied to allow a user to pull the door. Therefore, the user can easily open the door.

In addition, since the refrigerating compartment door or the freezing compartment door can be opened by one driving motor, thereby simplifying the structure.

The first embodiment describes a case of opening the freezing compartment door or the refrigerating compartment door. To the contrary, the first embodiment can open the plurality of freezing compartment doors or the plurality of refrigerating compartment doors. In other words, the idea of the first embodiment includes a fact that any one of the plurality of doors that opens and closes one or more storage compartment is opened by a single door opening apparatus. Therefore, any one of the plurality of doors may be referred to a first door and the other one of the plurality of doors may be referred to a second door.

Figure 11:
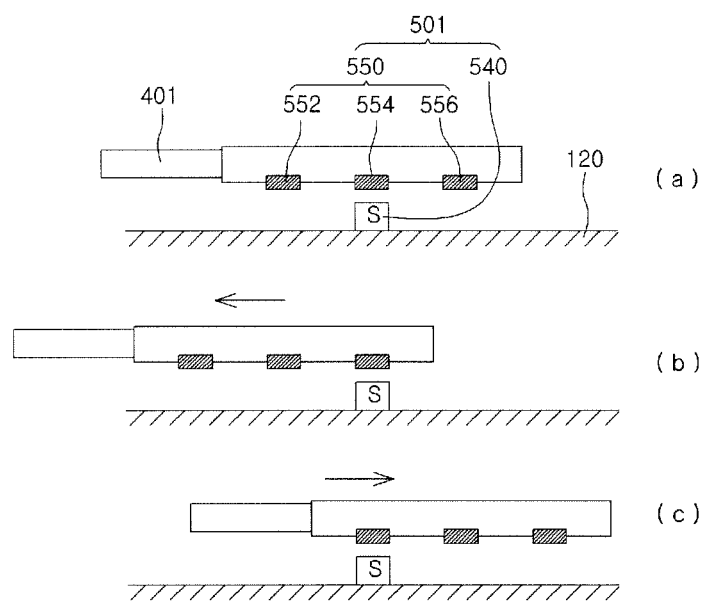
FIG. 11 is a diagram showing a shape where a position of the push member according to a second embodiment is changed.

FIG. 11 is a diagram showing a shape where the position of the push member according to a second embodiment is changed.

The components of the second embodiment are the same as those of the first embodiment except for a difference only in the position sensing mechanism. Therefore, only the feature components of the second embodiment will be described.

Referring to FIG. 11, the position sensing mechanism 501 according to the second embodiment includes a plurality of position confirming units 550 that are included in the second push member 401 and a single sensing unit 540 that is included in the moving guide corresponding to the second push member 401, by way of example.

The plurality of position confirming units 550 include first to third position confirming units 552, 554, and 556.

The second position confirming unit 554 is sensed in the sensing unit 540 in the state where the second push member 401 is positioned at an initial position. The first position confirming unit 554 is sensed in the sensing unit 540 in the state where the second push member 401 maximally moves forward. On the other hand, the third position confirming unit 556 is sensed in the sensing unit 540 in the state where the second push member 401 maximally moves backward.

Figure 12:
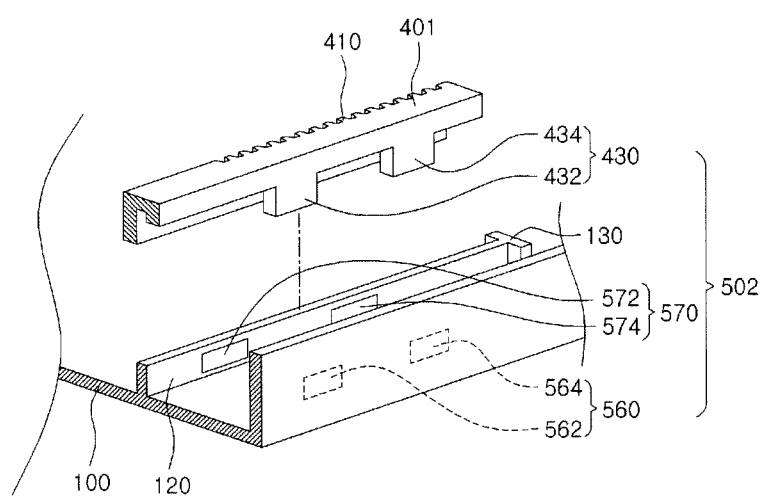
FIG. 12 is a partial perspective view showing a position sensing mechanism according to a third embodiment.

FIG. 12 is a partial perspective view showing a position sensing mechanism according to a third embodiment.

The components of the third embodiment are the same as those of the first embodiment except for a difference only in the position sensing mechanism. Therefore, only the feature components of the present embodiment will be described.

Referring to FIG. 12, the position sensing mechanism 502 according to the third embodiment includes a light emitting unit 560 (performing a role of the position confirming unit) that emits light, a light receiving unit 570 (performing a role of the sensing unit) that senses light emitted from the light emitting unit 560, and a blocking unit 430 that blocks light emitted from the light emitting unit 560.

In detail, the light emitting unit 560 is included in the case 100 and may be positioned at the side of the second push member 401 by way of example. The light emitting unit 560 emits light to the second push member 401. The light emitting unit 560 includes a first light emitting unit 562 and a second light emitting unit 564 that is spaced from the first light emitting unit 562.

The light receiving unit 570 is provided at one side of the moving guide 120 corresponding to the second push member 401. The light receiving unit 570 includes a first light receiving unit 572 and a second light receiving unit 574 that is spaced from the first light receiving unit 572.

The blocking unit 430 may be formed at the side of the second push member 401. The blocking unit 430 includes a first blocking unit 432 and a second blocking unit 434 that is spaced from the first blocking unit. A distance between the first blocking unit 432 and the second blocking unit 434 is the same as a distance between the first light emitting unit 562 and the second light emitting unit 564. In addition, the distance between the first light emitting unit 562 and the second light emitting unit 564 is the same as the distance between the first light receiving unit 572 and the second light receiving unit 574.

Each blocking unit 432 and 434 may extend downward from the second push member 401.

When the second push member 401 is positioned at the initial position, each blocking unit 432 and 434 blocks light from each light emitting unit 562 and 564. In other words light from each light emitting units 562 and 564 is not sensed in the light receiving unit 570.

When the second push member 400 maximally moves forward, the second blocking unit 434 blocks light from the first light emitting unit 562. Therefore, the second light receiving unit 574 senses light from the second light emitting unit 564.

On the other hand, when the second push member 400 maximally moves backward, the first blocking unit 432 blocks light from the second light emitting unit 564. Therefore, the first light receiving unit 572 senses light from the first light emitting unit 562.

In the exemplary embodiments, the position change of one or more push member is sensed by the position sensing mechanism. Unlike this, the stop of the driving motor or the change in the rotating direction of the driving motor may be determined according to the rotation number of the driving motor by an encoder (rotation number sensing unit) that senses the rotation number of the driving motor. In other words, when the rotation number in one direction of the driving motor reaches a reference rotation number, the rotating direction of the driving motor may be changed. After the rotating direction of the driving motor is converted, when the rotation number of the driving motor reaches the reference rotation number, the driving motor may stop.

In addition, the stop of the driving motor or the change in the rotating direction of the driving motor may be determined according to the operation time of the driving motor using a timer that calculates the operation time of the driving motor. In other words, when the operation time of the driving motor reaches the reference time, the rotating direction of the driving motor may be changed. After the rotating direction of the driving motor is converted, when the operation time of the driving motor reaches the reference time, the driving motor may stop.

The foregoing describes the case where all the components configuring the exemplary embodiments of the present invention are operated by being coupled in one body, but the present invention is not necessarily limited to the exemplary embodiments. In other words, one or more of all the components may be selectively coupled and operated in the object of the present invention. In addition, terms such as "comprising", "configuring", or "having" described above mean including the corresponding components unless indicated otherwise and thus, it is to be construed that terms may further include other components rather than excluding other components. Unless indicated otherwise, it is to be understood that all the terms used in the specification including technical and scientifical terms have the same meaning as those that are generally understood by those skilled in the art. Like terms defined in a dictionary, it is to be construed that generally used terms conform to a context of a related technology and unless being definitively defined in the present invention, terms are not construed as excessively formal meanings.

The technical spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. A method for controlling a refrigerator, comprising:
  inputting an opening signal to open a selected door of a plurality of doors;
  rotating a driving motor to open a selected door;
  transferring power of the driving motor to a plurality of push members through a power transfer unit in order to move the plurality of push members guided by a plurality of moving guides; and
  opening the selected door by pushing the selected door of the plurality of doors by one of the plurality of push members,
  wherein each push member comprises a rack gear and the power transfer unit comprises at least one pinion gear engaged with the rack gear to transfer power of the driving motor to the rack gear,
  wherein at least one of the plurality of push members comprises a plurality of position confirming units that are spaced apart from each other and at least one of the plurality of moving guides comprises at least one sensing unit that senses one or more of the plurality of position confirming units, and
  wherein the power transfer unit comprises a worm gear that is connected to a rotating shaft of the driving motor and a plurality of pinion gears that are rotated based on rotation of the worm gear.

2. The method according to claim 1, wherein when one of the plurality of push members pushes the selected door, the other one of the plurality of push members is spaced from a non-selected door.

3. The method according to claim 1, wherein the plurality of push members are disposed in parallel, and when the driving motor is operated, the plurality of push members move in an opposite direction to each other.

4. The method according to claim 1, further comprising a rotation number sensing unit that senses a rotation number of the driving motor, and
  wherein the stop of the driving motor or the direction change of the driving motor is determined according to the rotation number of the driving motor that is sensed by the rotation number sensing unit.

5. The method according to claim 1, further comprising a timer that calculates an operation time of the driving motor
  wherein the stop of the driving motor or the direction change of the driving motor is determined according to the operation time of the driving motor calculated by the timer.

* * * * *